(12) United States Patent
Sundaram et al.

(10) Patent No.: US 11,258,877 B2
(45) Date of Patent: Feb. 22, 2022

(54) METHODS FOR MANAGING WORKLOADS IN A STORAGE SYSTEM AND DEVICES THEREOF

(71) Applicant: NetApp, inc., Sunnyvale, CA (US)

(72) Inventors: Sudha Sundaram, Cary, NC (US); John Scott, Cary, NC (US); Dean Kalman, Cary, NC (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/276,793

(22) Filed: Feb. 15, 2019

(65) Prior Publication Data
US 2020/0068042 A1    Feb. 27, 2020

Related U.S. Application Data

(60) Provisional application No. 62/703,863, filed on Jul. 26, 2018.

(51) Int. Cl.
| | |
|---|---|
| *H04L 29/08* | (2006.01) |
| *H04L 12/803* | (2013.01) |
| *H04L 67/61* | (2022.01) |
| *H04L 47/125* | (2022.01) |
| *H04L 67/1012* | (2022.01) |
| *H04L 67/1097* | (2022.01) |

(52) U.S. Cl.
CPC .......... *H04L 67/322* (2013.01); *H04L 47/125* (2013.01); *H04L 67/1012* (2013.01); *H04L 67/1097* (2013.01)

(58) Field of Classification Search
CPC . H04L 67/322; H04L 47/125; H04L 67/1012; H04L 67/1097
See application file for complete search history.

(56) References Cited

U.S. PATENT DOCUMENTS

| | | | |
|---|---|---|---|
| 5,983,261 A | 11/1999 | Riddle | |
| 6,243,450 B1 * | 6/2001 | Jansen | G06Q 30/0283 |
| | | | 379/100.04 |

(Continued)

FOREIGN PATENT DOCUMENTS

| | | |
|---|---|---|
| CA | 2839247 C | 4/2017 |
| CN | 100466625 C | 3/2009 |

(Continued)

OTHER PUBLICATIONS

International Search Report and Written Opinion for Application No. PCT/US2019/043246 dated Oct. 10, 2019, 10 pages.

(Continued)

*Primary Examiner* — John A Follansbee
*Assistant Examiner* — Fadi Haj Said
(74) *Attorney, Agent, or Firm* — Troutman Pepper Hamilton Sanders LLP (Rochester)

(57) ABSTRACT

The present technology relates to managing workload within a storage system. A quality of service parameter proposal associated with managing incoming network traffic is generated and provided to a plurality of nodes. The generated quality of service parameter proposal to manage the incoming network traffic is modified based on a response received from the nodes. The incoming network traffic is serviced using the data from the modified quality of service parameter proposal.

15 Claims, 3 Drawing Sheets

(56) References Cited

U.S. PATENT DOCUMENTS

| | | | |
|---|---|---|---|
| 6,438,141 B1* | 8/2002 | Hanko | H04J 3/1682 370/252 |
| 6,578,077 B1 | 6/2003 | Rakoshitz et al. | |
| 6,983,324 B1 | 1/2006 | Block et al. | |
| 7,072,295 B1* | 7/2006 | Benson | H04L 47/10 370/230 |
| 7,219,128 B2 | 5/2007 | Berkowitz et al. | |
| 7,532,642 B1* | 5/2009 | Peacock | H04L 47/10 370/468 |
| 7,729,376 B2 | 6/2010 | Klausberger et al. | |
| 7,908,410 B2 | 3/2011 | Gildfind et al. | |
| 8,086,718 B2 | 12/2011 | Li et al. | |
| 8,169,912 B2 | 5/2012 | Lee et al. | |
| 9,032,077 B1 | 5/2015 | Klein et al. | |
| 9,426,181 B2 | 8/2016 | Hoole et al. | |
| 9,515,956 B2* | 12/2016 | Hu | H04L 67/1095 |
| 10,019,189 B2 | 7/2018 | Kodama et al. | |
| 10,419,977 B2* | 9/2019 | Klatsky | H04W 72/085 |
| 2005/0015493 A1 | 1/2005 | Anschutz et al. | |
| 2005/0204054 A1 | 9/2005 | Wang et al. | |
| 2006/0002377 A1 | 1/2006 | Skog et al. | |
| 2012/0059934 A1 | 3/2012 | Rafiq et al. | |
| 2012/0284410 A1* | 11/2012 | Dudek | G06F 9/5027 709/226 |
| 2014/0310434 A1 | 10/2014 | Strange et al. | |
| 2015/0083270 A1 | 3/2015 | Nishida | |
| 2015/0149631 A1* | 5/2015 | Lissack | H04L 43/16 709/226 |
| 2015/0358581 A1 | 12/2015 | Zhou et al. | |
| 2016/0285724 A1* | 9/2016 | Lundquist | H04L 41/0896 |
| 2017/0255642 A1 | 9/2017 | Ben et al. | |
| 2017/0286179 A1 | 10/2017 | Dimnaku et al. | |
| 2018/0129425 A1 | 5/2018 | Park et al. | |
| 2018/0183696 A1* | 6/2018 | Chang | H04L 47/30 |
| 2019/0124012 A1* | 4/2019 | Hong | H04L 45/02 |
| 2020/0029249 A1 | 1/2020 | Livanos et al. | |

FOREIGN PATENT DOCUMENTS

| | | |
|---|---|---|
| CN | 103650435 A | 3/2014 |
| CN | 104850634 A | 8/2015 |
| CN | 107122442 A | 9/2017 |
| EP | 1513071 B1 | 9/2007 |
| EP | 2073564 A1 | 6/2009 |
| EP | 2506480 A2 | 10/2012 |
| EP | 2648371 A1 | 10/2013 |
| JP | 2002292584 A | 10/2002 |
| WO | 2015168909 A1 | 11/2015 |
| WO | 2016133508 A1 | 8/2016 |
| WO | 2017201387 A1 | 11/2017 |

OTHER PUBLICATIONS

PCT International Search Report and Written Opinion for corresponding PCT/US2019/043246, dated Oct. 10, 2019.

International Preliminary Report on Patentability for corresponding PCT Application Serial No. PCT /US2019/043246, dated Feb. 4, 2021.

* cited by examiner

METHODS FOR MANAGING WORKLOADS IN A STORAGE SYSTEM AND DEVICES THEREOF

This application claims the benefit of U.S. Provisional Patent Application Ser. No. 62/703,863, filed Jul. 26, 2018, which is hereby incorporated by reference in its entirety.

FIELD

The present technology pertains to the field of storage management, and particularly, directed to a method for managing workloads in a storage system.

BACKGROUND

Prior technologies use network storage systems for a variety of purposes, such as providing multiple users with access to shared data, backing up data and others. Networked storage systems are used extensively in NAS, SAN and virtual environments.

In such an environment, to place a workload for storing and/or retrieving data within a large storage environment having numerous resources can be challenging. Continuous efforts are being made to efficiently allocate resources for processing workloads in a networked storage environment. Unfortunately, the prior techniques being used in these efforts have resulted in a substantially high latency to the client devices.

DETAILED DESCRIPTION

Figure 1:
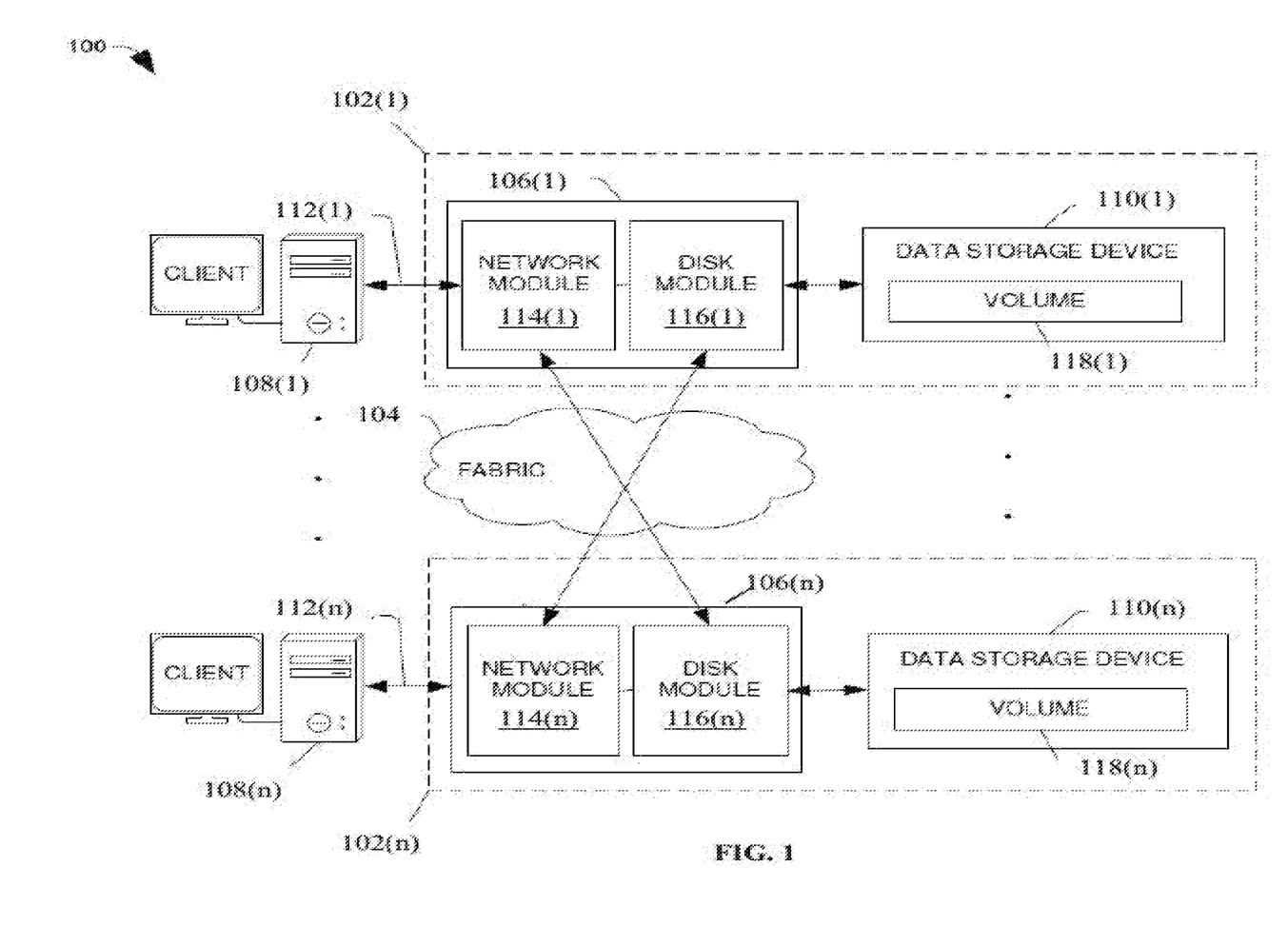
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and devices that enable more effectively and efficiently managing workload within a storage system.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations. In another example, a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices or storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI, FCP, SAS, NVMe, NVMe-oF for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, SSDs, storage class memories and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
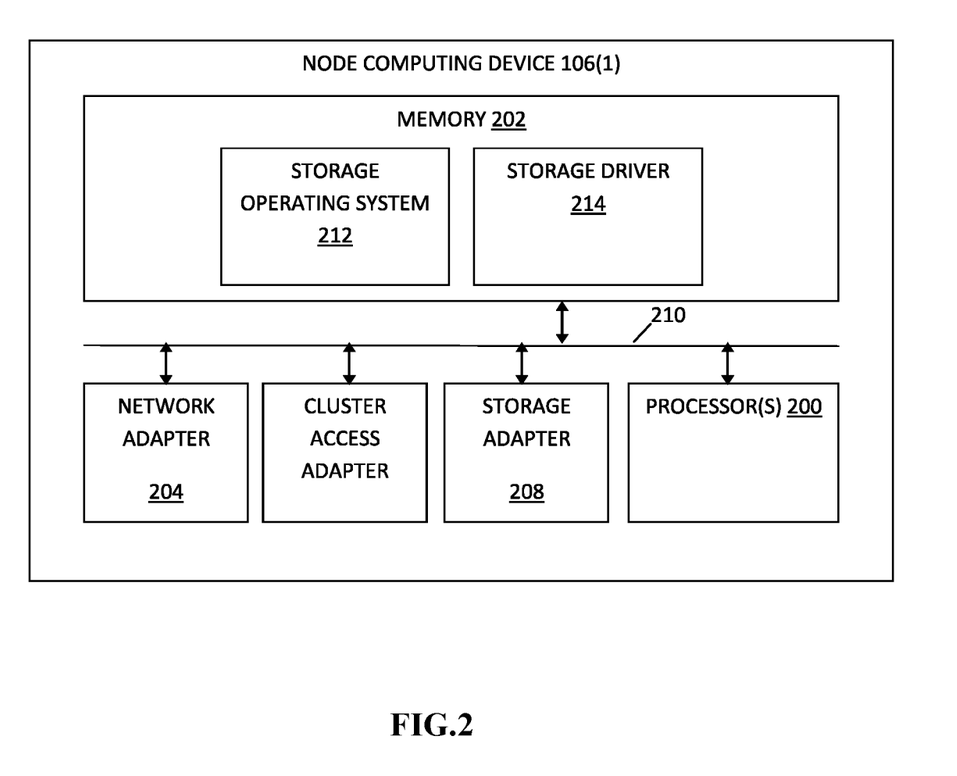
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIG. 3, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, SSDs, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIG. 3.

Figure 3:
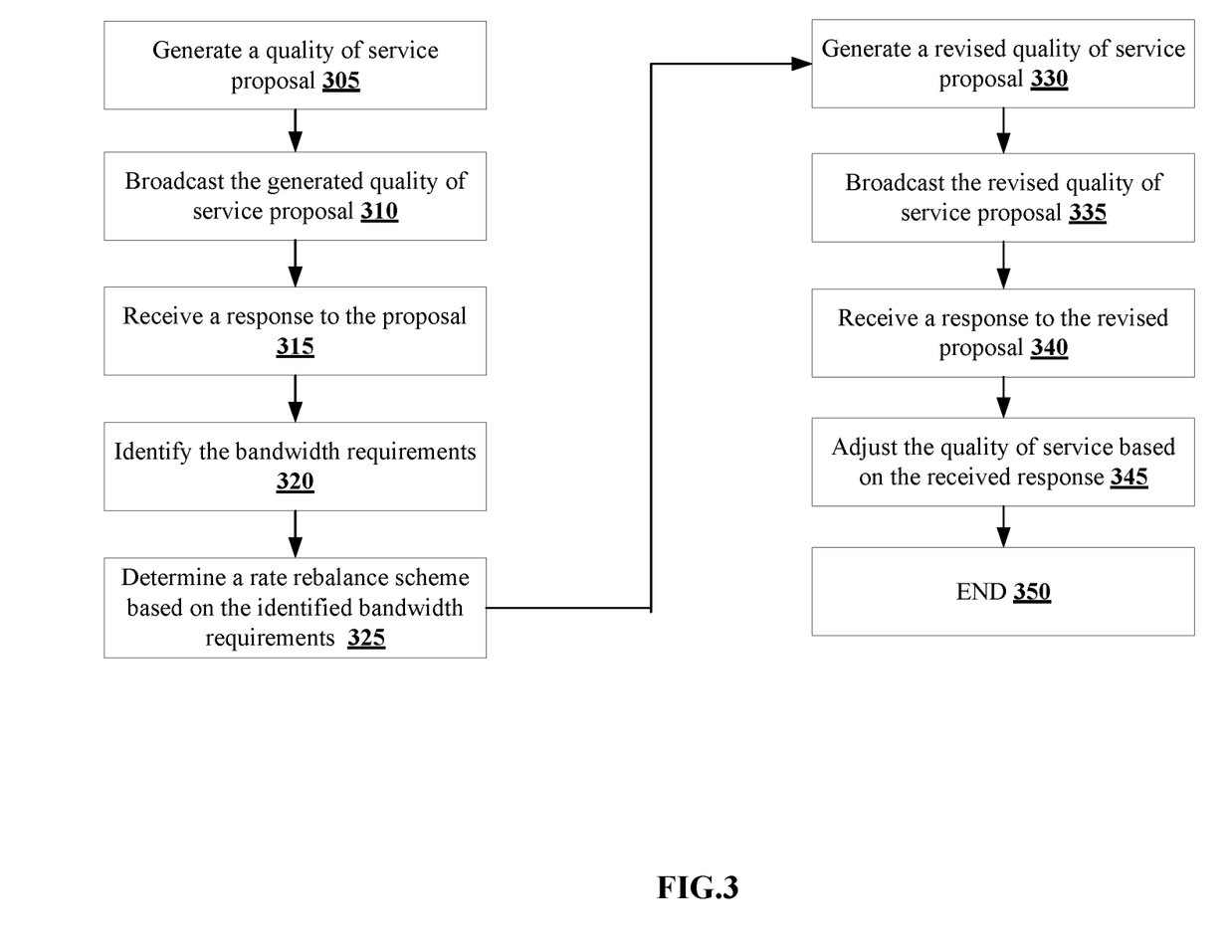
FIG. 3 is a flowchart of an exemplary method for managing workloads in a storage system.

Referring to FIG. 3, an exemplary method for managing workload within a storage system will now be described. In step 305 in this example, the node computing device 106(1) generates a quality of service proposal for all the other node computing devices 106(n) within a policy group, although the node computing device 106(1) can prepare the quality of service proposal to other subsets of the nodes or to other devices. In this example, the quality of service proposal is a cluster transaction proposal intended for all the node computing devices 106(2)-106(n) within the policy group and the proposal includes a request for one or more of the quality of service parameters, such as a current rate limit, a required rate limit, and/or a cluster rate limit, although the proposal can include other types or amounts of information.

In step 310, the node computing device 106(1) broadcasts the generated quality of service proposal to all the other node computing devices 106(2)-106(n) within the policy group, although the node computing device 106(2)-106(n) can broadcast the quality of service proposal to other devices within the storage cluster.

In step 315, the node computing device 106(1) receives a response from all the other node computing devices 106(2)-106(n) within the policy group, although in other examples a smaller subset of the responses may be received or utilized. In this example, the received response includes the requested current rate limit, the required rate limit, and/or the cluster rate limit, although the received response can include other types or amounts of information.

Next in step 320, the node computing device 106(1) identifies the bandwidth requirements from all of the received responses. In this example, the node computing device 106(1) gets a holistic picture of the bandwidth requirements for all the node computing devices 106(2)-106(n) within the policy group. Using the identified bandwidth requirements, in this example the node computing device 106(1) can get data associated with the amount of network traffic processed by each of the node computing devices and can also get data associated with an amount of spare bandwidth any of the node computing devices 106(2)-106(n) have.

In step 325, the node computing device 106(1) determines a rate balancing policy for all node computing devices 106(2)-106(n) within the policy group which may comprise all or different subsets of the node computing devices 106(2)-106(n). By way of example, one rate balancing policy can include distributing bandwidth of the cluster storage limit equally across all node computing devices 106(2)-106(n) within the policy group when one of the node computing devices requires bandwidth and no spare bandwidth is available. Additionally, another example of the rate balancing policy can include dividing the total spare limit among all node computing devices within the policy group that require the bandwidth when there is spare bandwidth available within the policy group. Further in this example, a one second settling time may be used on the node computing device 106(1) when the workload of the all the node computing devices 106(2)-106(n) within the policy group is constantly changing, although other types and amounts of settling time can be used. Furthermore, when one of the node computing devices 106(2)-106(n) within the policy group does not have the entire cluster bandwidth limit assigned and has need of additional bandwidth, it may generate grace tokens equivalent to 50 milliseconds of bandwidth to aid the client traffic while a new rate balance proposal is raised. Using the aforementioned rate balancing policy, the disclosed technology can perform rate balancing where traffic can flow through any node computing devices 106(1)-106(n) within the storage cluster. Additionally, a fast shifting rate limit is a determined with a scale out container that spans across node computing devices 106(1)-16(n) in the storage cluster.

In step 330, the node computing device 106(1) generates a revised quality of service parameter proposal including an absolute effective bandwidth limit for each of the node computing device 106(2)-106(n) within the policy group, although the revised quality of service proposal can include other types or amounts of information. In this example, the absolute effective bandwidth is determined based on the type of the rate balancing policy that is selected in step 325, although the absolute effective bandwidth can be determined based on other types or numbers of other parameters.

In step 335, the node computing device 106(1) broadcasts the revised quality of service proposal to all of the node computing devices 106(2)-106(n) within the policy group, although the node computing device 106(1) can broadcast the revised quality of service proposal to other devices within the storage cluster.

In step 340, the node computing device 106(1) receives a response from all the node computing devices 106(2)-106(n) within the policy group to the revised quality of service proposal. In this example, this received response includes accepting the revised quality of service proposal, although the node computing device 106(1) can receive other types of responses from the node computing devices 106(2)-106(n) within the policy group.

In step 345, the node computing device 106(1) and all the other node computing devices 106(2)-106(n) adjust the local bandwidth configurations based on the absolute effective bandwidth limit that was received in the revised quality of service proposal, although the node computing device 106(1) and/or the other node computing devices 106(2)-106(n) can adjust the local bandwidth configurations based on other types or numbers of parameters and may adjust in other manners. The exemplary method ends at step 350.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method, comprising:
broadcasting, by one of a plurality of node computing devices of a policy group, a quality of service parameter proposal to each other of the node computing devices;
identifying, by the one of the node computing devices, at least one of the other of the node computing devices that require an adjustment to a quality of service parameter based on received responses to the broadcast quality of service parameter proposal;
generating, by the one of the node computing devices, an absolute effective bandwidth limit for each of the node computing devices based on a rate balancing policy that includes dividing spare bandwidth for the policy group among the node computing devices, wherein the spare bandwidth is determined based on one or more rates returned by each of the other of the node computing devices in response to the broadcast quality of service parameter proposal;
broadcasting, by the one of the node computing devices, modified quality of service parameter proposals to the other of the node computing devices, wherein the modified quality of service parameter proposals comprise the absolute effective bandwidth limits; and
adjusting, by the one of the node computing devices, one or more local bandwidth configurations based on one of the absolute effective bandwidth limits.

2. The method as set forth in claim 1, further comprising dividing, by the one of the node computing devices, an additional limit to the quality of service parameter equally among the identified at least one of the other of the node computing devices, when there is the additional limit to the quality of service parameter based on a total quality of service parameter value for the node computing devices.

3. The method as set forth in claim 1, further comprising dividing, by the one of the node computing devices, a difference of a total quality of service parameter value for the node computing devices and a cluster limit value for the node computing devices equally among the identified at least one of the other of the node computing devices, when a determination indicates the total quality of service parameter value is less than the cluster limit value.

4. The method as set forth in claim 1, wherein the one or more rates comprise a current rate limit, a required rate limit, or a cluster rate limit.

5. A non-transitory machine readable medium having stored thereon instructions for managing workload within a storage system comprising machine executable code which when executed by one of a plurality of node computing devices of a policy group causes the one of the node computing devices to:
broadcast a quality of service parameter proposal to each other of the node computing devices;
identify at least one of the other of the node computing devices that require an adjustment to a quality of service parameter based on received responses to the broadcast quality of service parameter proposal;
generate an absolute effective bandwidth limit for each of the node computing devices based on a rate balancing policy that includes dividing spare bandwidth for the policy group among the node computing devices, wherein the spare bandwidth is determined based on one or more rates returned by each of the other of the node computing devices in response to the broadcast quality of service parameter proposal;
broadcast modified quality of service parameter proposals to the other of the node computing devices, wherein the modified quality of service parameter proposals comprise the absolute effective bandwidth limits; and
adjust one or more local bandwidth configurations based on one of the absolute effective bandwidth limits.

6. The non-transitory machine readable medium as set forth in claim 5, wherein the machine executable code, when executed by the one of the node computing devices, further causes the one of the node computing devices to divide an additional limit to the quality of service parameter equally among the identified at least one of the other of the node computing devices, when there is the additional limit to the quality of service parameter based on a total quality of service parameter value for the node computing devices.

7. The non-transitory machine readable medium as set forth in claim 5, wherein the machine executable code, when executed by the one of the node computing devices, further causes the one of the node computing devices to divide a difference of a total quality of service parameter value for the node computing devices and a cluster limit value for the node computing devices equally among the identified at least one of the other of the node computing devices, when a determination indicates the total quality of service parameter value is less than the cluster limit value.

8. The non-transitory machine readable medium as set forth in claim 5, wherein the one or more rates comprise a current rate limit, a required rate limit, or a cluster rate limit.

9. A node computing device of a plurality of node computing devices of a policy group, the node computing device comprising:
a memory containing machine readable medium comprising machine executable code having stored thereon instructions for managing workload within a storage system; and
a processor coupled to the memory, the processor configured to execute the machine executable code to cause the processor to:
broadcast a quality of service parameter proposal to each other of the node computing devices;
identify at least one of the other of the node computing devices that require an adjustment to a quality of service parameter based on received responses to the broadcast quality of service parameter proposal;
generate an absolute effective bandwidth limit for each of the node computing devices based on a rate balancing policy that includes dividing spare bandwidth for the policy group among the node computing devices, wherein the spare bandwidth is determined based on one or more rates returned by each of the other of the node computing devices in response to the broadcast quality of service parameter proposal;
broadcast modified quality of service parameter proposals to the other of the node computing devices, wherein the modified quality of service parameter proposals comprise the absolute effective bandwidth limits; and
adjust one or more local bandwidth configurations based on one of the absolute effective bandwidth limits.

10. The node computing device as set forth in claim 9, wherein the processor is further configured to execute the machine executable code to further cause the processor to divide an additional limit to the quality of service parameter equally among the identified at least one of the other of the node computing devices, when there is the additional limit to the quality of service parameter based on a total quality of service parameter value for the node computing devices.

11. The node computing device as set forth in claim 9, wherein the processor is further configured to execute the machine executable code to further cause the processor to divide a difference of a total quality of service parameter value for the node computing devices and a cluster limit value for the node computing devices equally among the identified at least one of the other of the node computing devices, when a determination indicates the total quality of service parameter value is less than the cluster limit value.

12. The node computing device as set forth in claim 9, wherein the one or more rates comprise a current rate limit, a required rate limit, or a cluster rate limit.

13. The node computing device as set forth in claim 9, wherein the processor is further configured to execute the machine executable code to further cause the processor to determine a bandwidth requirement for another one or more of the node computing devices based on one or more received responses to the broadcast quality of service parameter proposal.

14. The method as set forth in claim 1, further comprising determining, by the one of the node computing devices, a bandwidth requirement for another one or more of the node computing devices based on one or more received responses to the broadcast quality of service parameter proposal.

15. The non-transitory machine readable medium as set forth in claim 5, wherein the machine executable code, when executed by the one of the node computing devices, further causes the one of the node computing devices to determine a bandwidth requirement for another one or more of the node computing devices based on one or more received responses to the broadcast quality of service parameter proposal.

* * * * *